United States Patent [19]

Freeny et al.

[11] 4,236,245
[45] Nov. 25, 1980

[54] RING COMMUNICATION SYSTEM DATA PACKETS REUSABLE A VARIABLE NUMBER OF TIMES

[75] Inventors: Stanley L. Freeny, Middletown; Arthur B. Larsen, Colts Neck; Thomas J. Pedersen, Lincroft, all of N.J.

[73] Assignee: Bell Telephone Laboratories, Incorporated, Murray Hill, N.J.

[21] Appl. No.: 30,811

[22] Filed: Apr. 17, 1979

[51] Int. Cl.³ .............................................. H04J 6/02
[52] U.S. Cl. ...................................... 370/94; 370/82; 370/89
[58] Field of Search ........................ 370/82, 94, 68, 89

[56] References Cited

U.S. PATENT DOCUMENTS

| | | | |
|---|---|---|---|
| 3,680,056 | 7/1972 | Kropfl | 370/89 |
| 4,011,545 | 3/1977 | Nadir | 340/172.5 |
| 4,071,706 | 1/1978 | Warren | 370/94 |
| 4,154,983 | 5/1979 | Pedersen | 370/94 |

OTHER PUBLICATIONS

Bell System Technical Journal, vol. 51, No. 6, Jul.-Aug. 1972; "Network for Block Switching of Data" by Pierce; pp. 1133-1145.

Primary Examiner—David L. Stewart
Attorney, Agent, or Firm—Roy C. Lipton

[57] ABSTRACT

Communication between a plurality of data terminals (101(1) to 101(b)) serially interconnected with a main terminal (102) is provided by data frames or packets having a data portion for accommodating a burst of data preceeded by a header portion for accommodating address data followed by an empty/full "flag" bit indicating whether the addressee station has withdrawn the data burst. If a terminal has a data burst to send, it locates an empty packet, inserts the addressee designation in the packet subsequent to any prior address that the packet might contain, interposes delay in the passage therethrough of the packet so that the duration is increased to accommodate the new address and overwrites the data burst into the data portion. The main terminal detects when the data burst is withdrawn and signals the originating terminal to remove the data delay.

11 Claims, 9 Drawing Figures

MULTIPLE ADDRESS

MINIMUM PACKET

SINGLE ADDRESS

MULTIPLE ADDRESS

*FIG. 3* LOGIC & TIMING CIRCUITS 7

LOGIC & TIMING CIRCUITS 27

RING COMMUNICATION SYSTEM DATA PACKETS REUSABLE A VARIABLE NUMBER OF TIMES

TECHNICAL FIELD

This invention relates to data transmission systems and, more particularly, to transmission systems for conveying packets or frames of data through serially connected terminals or stations.

BACKGROUND OF THE INVENTION

The use of packets or frames of data is an advantageous format for conveying data messages from originating stations or terminals to designated or addressee terminals. Data packets typically comprise a fixed number of data bits. Each packet is constructed to include a packet header portion which contains synchronizing or framing data identifying the start of the packet, address data defining the addressee station and other control data information which may include, for example, indications whether the packet is available to convey the data and/or whether data information has been withdrawn from the packet. The packet is further structured to contain a data portion following the header portion, which data portion accommodates a burst of data (a plurality of data bits) which is destined for the addressee station identified in the header portion.

When a station on a data packet transmission system desires to send a message, it typically arranges the message into a plurality of data bursts, identifies data packets on the transmission line which are available to convey data, inserts the appropriate address information in the header portion of the available packet and inserts a data burst into the data portion. Advantageously, the sending or originating station also inserts appropriate control information in the header, including information that the packet is now occupied (unavailable) and the data burst therein has not yet been withdrawn by the addressee station. This packet is then conveyed over the transmission system to the addressee station which identifies its own address in the header portion and thereupon withdraws the data burst from the data portion, indicating in the header portion that the data is withdrawn and the packet is therefore available for reuse.

Data packet communication systems have been employed in various different types of systems, one system being the ring or loop system described in "Network for Block Switching of Data" by J. R. Pierce, BSTJ 51, No. 6, July-August 1972, pp 1133-1145. In the Pierce arrangement, a transmission line serially passes from one to another of a plurality of stations arranged in a ring or loop configuration. Data packets are passed from station to station, each station monitoring the packet header to determine if the data burst in the packet is destined for that station. Alternatively, if the station has a message to send, it monitors the packet header to determine if the packet is available. Assuming, in this latter case, that the packet is in fact available, the station thereupon overwrites its address and control information into the packet header and overwrites a data burst into the packet data portion. When the packet arrives at the addressee station, the data burst is then withdrawn and the header information is modified to indicate that the packet is reusable.

The information indicating whether the packet is available (empty) or full is typically contained in a single "flag" bit which may, alternatively, preceed or follow the address bits in the packet header. If the protocol requires that the flag bit preceeds the address bits, when the station or terminal monitors the packet header to determine whether the data burst is destined for the station, it must also storage delay the address bits in order to modify the flag bit if the burst is to be withdrawn. If the protocol requires that the flag bit follows the address bits and the station or terminal desires to send a data burst, it delays the passage of the address bits therethrough so that it can overwrite the new address upon determining that the packet is empty. In either case, a station (storage) delays the data passing therethrough for an interval corresponding to the signaling interval of the address bits. If there are a larger number (n) of stations on the loop requiring m bits of data to identify each station, the total cumulative loop delay for address monitoring equals m×n bit intervals, which delay may be considered excessive for some data applications.

It is an object of this invention to reduce the (storage) delay required for packet header monitoring.

SUMMARY OF THE INVENTION

In accordance with this invention, the sending or originating station inserts address bits identifying the new addressee station subsequent to that portion of the header accommodating the old address bits (which identify the addressee station that priorly withdrew the data burst). A sending terminal in a loop system using the protocol requiring that the empty/full flag bit follows the address bits may thus determine whether the packet is empty (or full) and thereafter insert the new address bits without (storage) delaying the data passing therethrough. The only delay of the subsequent data burst in the packet constitutes the bit intervals of the new address inserted into the packet (which delay for the one insertion is only m bit intervals).

In accordance with a feature of this invention, the originating station or terminal, upon inserting the new address, also delays the passage of data therethrough for an interval equal to the signaling interval of the new address data. This has the effect of correspondingly increasing the duration of the data packet header to accommodate the new address data, whereby a variable number of new addresses can be inserted into the header portion without modifying the data portion.

In the specific embodiment of this invention, described hereinafter, the new address inserted by the sending terminal is stored in a storage delay circuit which is connected to the transmission system when the terminal determines that an empty packet is passing therethrough. In accordance with another feature of this invention, the passage of data through the station is interrupted while the new address is inserted. When the passage of data is resumed, the incoming data is applied to the input of the storage delay circuit to thereby provide the delay of the passage of data through the terminal.

In accordance with a further feature of this invention, the loop is provided with a main terminal that monitors the packets and writes in predetermined data when the data burst written into the packet has been withdrawn by the addressee terminal. The sending terminal, upon detecting the predetermined data, removes the storage delay circuit from the transmission system to thereby reduce the duration of the packet and remove the inserted address.

The foregoing and other objects and features of this invention will be more fully understood from the following description of an illustrative embodiment thereof taken in conjunction with the accompanying drawings.

DETAILED DESCRIPTION

Figure 1:
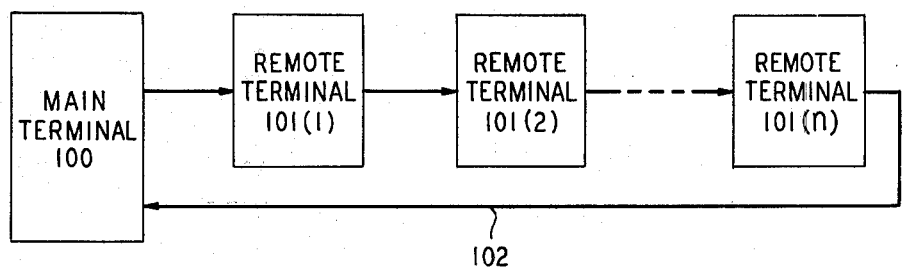
FIG. 1 shows in block form a ring or loop transmission system which includes terminals arranged to communicate with data frames or packets in accordance with this invention.

A typical loop system is shown in FIG. 1. In general, the loop comprises a main terminal 100 and a plurality of remote terminals 101(1) through 101(N), all serially interconnected by way of transmission line 102. In general, each remote terminal 101 includes equipment for receiving incoming serial data on transmission line 102 for generally repeating the data to the outgoing side of the transmission line, for monitoring the data on the transmission line and, where appropriate, for overwriting information onto the outgoing data applied to the transmission line, which information is provided by external data communication equipment, not shown; for inserting "fragments" of information into the data and providing corresponding storage delay to the data between the incoming and the outgoing sides of the terminal; for removing the data "fragments" from the transmission line; and for supplying incoming data to the external communication equipment.

Main terminal 100 includes equipment for providing synchronizing and framing information to remote terminals 101, for forming the signaling structure used by the loop system, for inserting housekeeping and control information in the data and for providing appropriate storage delay to the data, as described hereinafter.

The above-mentioned signaling structure used in this loop system, in accordance with this invention, comprises frames or packets of data. Each data frame or packet has a header portion containing framing, housekeeping and address information and a data portion containing message information (in the form of a burst of data) obtained from the external communication equipment. The cumulative storage delay provided by the main terminal 100 and by all of the remote terminals 101 is such that the loop stores or accommodates the data bits of one complete data frame or packet (or, optimally, may store a plurality of packets). In accordance with this invention, the frame or data packet header portion may accommodate a variable number of addresses and the packet may be variable in bit length.

In order that the loop may accommodate or store the variable length packet, in accordance with the invention, the remote terminal 101 inserting the address "fragment" increases the amount of storage delay that the remote terminal provides.

Figure 6:
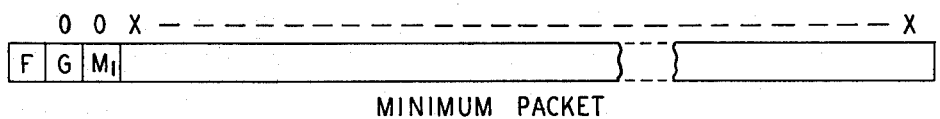
FIGS. 6-9 show signal bit representations of typical data packets arranged in accordance with the protocol used by the loop system.

FIG. 6 discloses a minimum packet, that is, the smallest size packet in bit length that the system accommodates. The first bit in any frame or packet is the frame signal F which starts the header portion. The line signaling is advantageously bipolar signaling and the frame signal is a unique bipolar violation, as shown in U.S. Pat. No. 3,745,361, issued to K. W. Boyd et al on July 10, 1973. The second bit in the packet header portion comprises a gap bit (G), which in the case of the minimum frame is invariably a "0" bit. (The function of the gap bit will be further described hereinafter.) The third bit in the frame header portion constitutes an "active" address bit ($M_1$) which indicates whether an address will follow. In the case of the minimum length frame this active address bit is a "0" bit to indicate that no address follows and that this bit therefore constitutes the end of the packet header portion. The bits following the header portion constitute the data portion of the packet, which data portion may be a fixed number of bits (such as 128 bits, for example). The information in the data portion is supplied by a data burst from external communication equipment for delivery to other external communication equipment identified by address information. The minimum length packet, having no address, does not contain a data burst destined for delivery.

When a minimum frame is being circulated on the loop, each remote terminal 101 provides a minimum storage delay which in this embodiment constitutes storage of four data bits. The main terminal 100 provides the remaining storage delay which, when added to the cumulative delay of the remote terminals, accommodates all of the data bits of the minimum length data packet.

Figure 7:
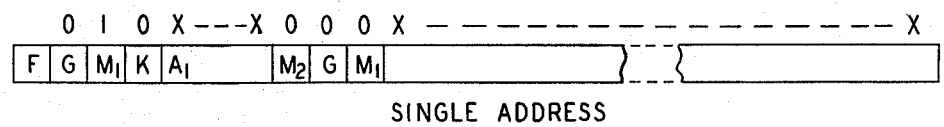

FIG. 7 depicts a data frame or packet with a single address in the header portion. It is presumed that one of remote terminals 101 has inserted the address and has overwritten a data burst into the data portion. As described in detail hereinafter, this remote terminal 101 inserts a multibit fragment in the header following the "G" or gap bit. This multibit fragment constitutes an active address bit ($M_1$) which will be a "1" bit to indicate that an address follows; a recirculating bit (K) which, in this case is a "0" bit; the address bits ($A_1$) identifying the addressee station; a "remove" address bit ($M_2$) which is a "0" bit to indicate that the data burst in the data portion of the packet has not been delivered; and a following gap bit (G) ending the address fragment (which gap bit is a "0" bit). The sending terminal also insures that the next "active" address bit ($M_1$) is a "0" bit to indicate that no further address follows and the header portion is therefore terminated. The remote terminal also overwrites a data burst into the data portion. Thus, the terminal has inserted a header fragment of four control bits plus address bits identifying the address terminal and has overwritten a data burst into the data portion of the packet. In addition, the remote terminal inserts additional storage delay therein to accommodate this multibit fragment. The total delay of the loop is therefore increased to accommodate the additional plurality of bits in the frame.

Figure 8:
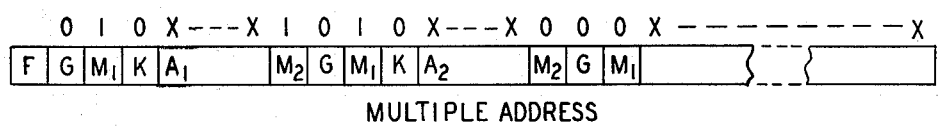

A remote terminal 101 may overwrite a second data burst into a packet, after delivery of the first data burst, and add a second address fragment to the packet header. A packet with a second address is shown in FIG. 8. When this packet arrives at the "overwriting" terminal, it contains the header bits written by the first sending terminal modified by the addressee terminal which changes the "remove" address bit ($M_2$) to a "1" bit to indicate that the data burst has been delivered. This "overwriting" terminal, upon determining that the burst has been delivered (($M_2$) bit is "1" and succeeding ($M_1$) bit is "0"), adds a second address fragment, changing the second "active" address bit ($M_1$) to a "1" bit and inserting the address bits ($A_2$) of the second addressee terminal and overwriting the data burst to be delivered into the data portion.

As described above, the recirculating bit (K) is initially set to "0" by the remote terminal 101 inserting the address fragment. This bit is set to a "1" by the main terminal 100 as the address fragment passes therethrough. The main terminal 100 will thereafter look at the K bit for each address fragment to determine if the fragment has circulated through at least once before to provide an indication (described below) for the remote terminals to remove the address fragment.

Main terminal 100 also monitors the gap marker bit (G) of each address fragment. As described above, the first gap marker bit is initially "0" in the minimum packet or frame and subsequent gap marker bits are set to "0" by the remote terminal 101 which inserts the address fragment. The main terminal will change a gap marker bit to a "1" in the prior recirculation of the packet through the main terminal or if the active and remote address bits ($M_1$ and $M_2$) in the address fragment are both "1" bits to indicate that the corresponding data burst has been delivered. In either event, main terminal 100 sets the gap marker bit to a "1" bit and a remote terminal 101, which has priorly inserted an address fragment and is therefore providing additional storage delay corresponding to the address fragment, removes or erases the address fragment and eliminates the additional storage delay which it has previously been providing. The bit length of the header is therefore reduced and the cumulative storage of the loop correspondingly reduced.

Figure 2:
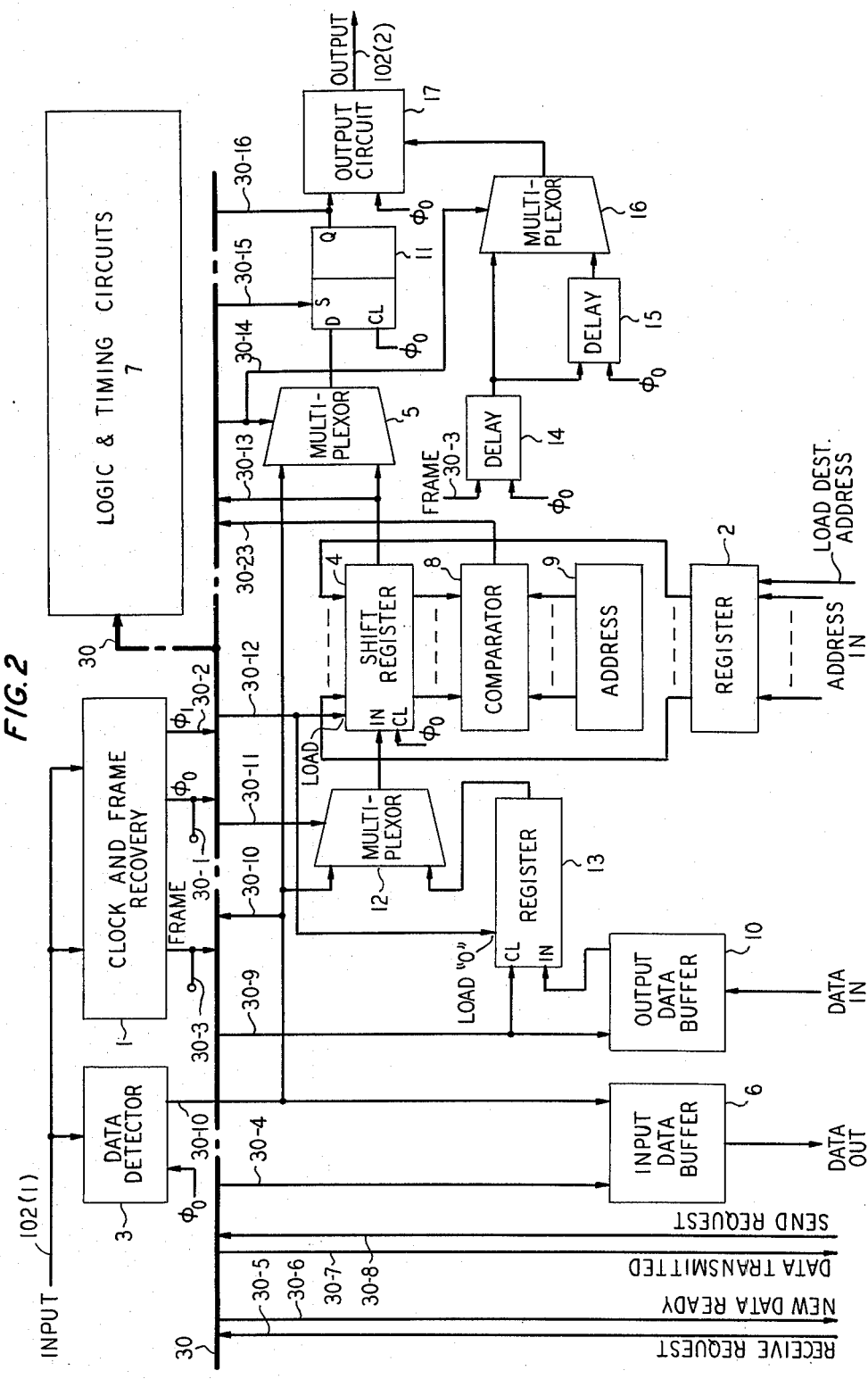
FIG. 2 discloses, in schematic form, the circuitry and equipment of a typical remote terminal arranged in accordance with this invention.

A typical remote terminal 101 is shown in FIG. 2. The incoming data stream is received on input line 102(1) and is applied to clock and frame recovery circuit 1 and data detector circuit 3.

Clock and frame recovery circuit 1 comprises a recovery circuit which may be implemented by the recovery and regenerating logic circuitry shown in FIG. 2 of the above-identified K. W. Boyd et al patent. Clock and frame recovery circuit 1 monitors the bipolar line signals and produces clock pulses in phase with the line signal crossovers, clock pulses 180 degrees out of phase with the line signal crossovers and "frame" pulses in response to the frame signal bipolar violations. The clock pulses (hereinafter identified as clock pulses $\Phi_0$ and $\Phi_1$) are applied to output leads 30-1 and 30-2, respectively. Leads 30-1 and 30-2 are passed to cable 30, while lead 30-1 is additionally connected throughout the remote terminal. The "frame" pulses are applied to output lead 30-3. Lead 30-3 extends to cable 30 and also is passed to other circuitry in remote terminal 101.

Data detector 3 functions to detect the incoming bipolar pulse stream on input line 102(1) and convert the stream to NRZ bit stream. Data detector 3 may also advantageously include a single bit cell which utilizes the $\Phi_0$ clock pulses from clock recovery circuit 1 to clock in the line pulse stream (and thus providing a one bit storage delay). The output of the cell in data detector 3 may then extend via lead 30-10 to other circuitry in remote terminal 101. As shown in FIG. 2, leads 30-10 extends to cable 30 and additionally extends to inputs of input data buffer 6 and multiplexers 5 and 12.

Cable 30 is passed to logic and timing circuit 7. In general, it is the function of logic and timing circuit 7 to determine the timing of various operations of remote terminal 101. Upon determination, logic and timing circuit 7 generates control signals which, in turn, control the operations of the various circuitry in remote terminal 101, as described in detail hereinafter.

As noted above, the signal output of data detector 3 applied to lead 30-10 is passed to one input of multiplexer 5. It is the function of multiplexer 5 to select one or the other of two inputs and pass that selected input to two-stage register 11. (It is noted that the second input to multiplexer 5 comprises the output of shift register 4 on lead 30-13). The control of this selection is exercised by logic and timing circuit 7 by way of lead 30-14. In the initial condition, logic and timing circuit 7 is controlling multiplexer 5 to select the data on lead 30-10 and pass this data to the D input of the first stage of register 11.

The data provided to register 11 is clocked therein and therethrough by the $\Phi_0$ clock pulses. Accordingly, the incoming data passed by data detector 3 is shifted through two-stage shift register 11 and passed to output lead 30-16. This output lead is then connected to cable 30 and to the input of output circuit 17. It is noted that register 11 provides a two-bit storage delay for the data.

Output circuit 17 may advantageously comprise a one-stage register or cell plus a bipolar switch and line driver for converting the data bits to bipolar line signals (the switch and driver circuitry being similar to corresponding circuitry shown in FIG. 1 of the above-identified K. W. Boyd et al patent). Data is clocked into the register by the $\Phi_0$ clock pulse and this data is then passed via the switch and line driver to output 102(2). The data passed to output circuit 17 is normally obtained from the output of register 11 by way of lead 30-16. It is noted, however, that a frame pulse at the output of multiplexer 16 may be provided to output circuit 17 and this frame pulse is overwritten into output circuit 17 to form a bipolar violation, as shown in the K. W. Boyd et al patent.

As discussed above, the data on lead 30-10 is also passed to an input of multiplexer 12 which, under control of signals on lead 30-11, selects data on one or the other of two input leads and passes the selected data to the input of shift register 4. The control signal on leads 30-11 are from logic and timing circuit 7 and initially this control signal selects the data on lead 30-10. It is noted that the other input to multiplexer 12 is derived from the output of shift register 13.

Shift register 4 is a multistage shift register having a plurality of stages equal in number to the number of bits in an address fragment. Shift register 4 accepts the data from multiplexer 12 and clocks it therethrough under control of the $\Phi_0$ clock pulses. The output of the last stage of shift register 4 is then passed to lead 30-13 which extends to cable 30 and is additionally passed to multiplexer 5, as noted above. In addition, the outputs of the several stages of shift register 4 are passed, in parallel, to comparator 8 for reasons discussed below. Initially, as noted above, the control signals on lead 30-11 are such that multiplexer 12 accepts the data on lead 30-10 and passes the data to shift register 4, which clocks the data therethrough.

Summarizing the passage of data through remote terminal 101, the incoming line signals are detected by data detector 3 which applies the recovered data to output lead 30-10. The data is then passed through multiplexer 5 to register 11 and register 11, in turn, clocks the data through to output circuit 17 which passes the data to output lead 102(2). It is noted that bit storage under this condition is provided by data detector 3, register 11 and output circuit 17 for a cumulative storage of four data bits. At the same time, the data on lead 30-10 is passed through multiplexer 12 to shift register 4. This data is then shifted through the register to output lead 30-13 and passed, in parallel, to comparator 8. Multiplexer 5 is not selecting the data on lead 30-13 so that the output of register 4 is not passed to register 11.

Timing for defining the instant, in time, that the frame pulse is applied to output circuit 17 is provided by delay circuits 14 and 15 and multiplexer 16. Delay circuit 14 provides a delay corresponding to the delay of register 11. Delay circuit 14 may therefore comprise a two-stage register arranged similarly to register 11. Delay circuit 15 provides a delay equal to the delay of register 4. Delay circuit 15 may therefore comprise a multistage register having a number of stages equal to the number of stages in register 4. Multiplexer 16 selects one or the other of two inputs thereto and provides the signals on that input to output circuit 17. Control of multiplexer 16 is provided by signals on lead 30-14.

Initially, multiplexer 16 is selecting the input connected to the output of delay circuit 14. The input to delay circuit 14 is provided by the frame pulse on lead 30-3. The frame pulse, thus delayed by delay circuit 14, is passed to multiplexer 16 which selects this pulse for application to output circuit 17. Since the delay of delay circuit 14 is equal to the delay of register 11, this frame pulse is applied to output circuit 17 at the same instant of time that the frame signal (or the equivalent thereof) is applied by register 11 to output circuit 17. As previously noted, the frame pulse provided by multiplexer 16 overwrites a bipolar violation frame signal into output circuit 17 and this frame signal bipolar violation is applied to output lead 102(2) at the appropriate instant of time that the frame signal should be passed on to the transmission loop.

The address bits identifying the remote station are permanently wired into address circuit 9. This address, together with a "0" bit which defines the condition of the $M_2$ bit in an address fragment of a packet containing a data burst not yet delivered, is applied to appropriate stages of comparator 8. Comparator 8 compares this information with information in corresponding stages of shift register 4.

The result of this comparison is applied to lead 30-23 which is passed via cable 30 to logic and timing circuit 7. Logic and timing circuit 7, being arranged to determine the arrival time of address fragments in the header, notes the comparison results of comparator 8 on lead 30-23 at the instant that an address fragment is in shift register 4. A comparison match by comparator 8 at this instant indicates to logic and timing circuit 7 that the incoming packet has undelivered data destined for this remote station.

Assume that the external customer equipment is prepared to accept a data burst. The equipment energizes "receive request" lead 30-5 (as is conventional for terminal equipment). This energized lead enables logic and timing circuit 7 so that when the address fragment in the packet header has been fully loaded into shift register 4, which address fragment contains the address of the remote station together with an $M_2$ bit which is "0", comparator 8 signals a comparison match and provides an enabling pulse to lead 30-23. Logic and timing circuit 7 pulses lead 30-15 to drive the first stage of register 11 to the set condition. Since, at this instant in time, the address fragment is fully loaded into shift register 4, the $M_2$ bit is now in the first stage of register 11. The setting of this first stage therefore changes the $M_2$ bit to a "1" bit to indicate that the data burst in the packet is delivered to the remote station. At the same time, logic and timing circuit 7 directs the $\Phi_0$ clock pulses to lead 30-4 whereby the subsequent data bits in the data portion of the packet on lead 30-10 are directed into input data buffer 6.

At the termination of the data packet and in response to the next frame pulse, logic and timing circuit 7 terminates the application of the clock pulses to lead 30-4 and thus stops the loading of data into input data buffer 6. At the same time, logic and timing circuit 7 provides a high condition to "new data ready" lead 30-6 to indicate to the customer equipment that a data burst is ready for its acceptance. The customer terminal removes the data burst from input data buffer 6 concurrently lowering the potential it applies to receive request lead 30-5. Logic and timing circuit 7 thereupon removes the high potential applied to lead 30-6, thus removing the "data ready" indication. The removal of data by the customer terminal permits it to re-establish a high potential on lead 30-5 to indicate that it is ready to accept a new data burst. Thus, the data burst has been removed by the customer terminal and a "1" bit has been overwritten into the $M_2$ bit position of the address fragment.

When the external customer equipment at a remote station desires to send data information, it loads the address of the destination station into register 2, loads a data burst into output data buffer 10 and raises the potential on send request lead 30-8. Register 2 is arranged so that, in addition to storage cells for storing the address, it is wired to permanently store other data bits which, with the address bits, make up an address fragment. More specifically, register 2 is wired to permanently store a "1" bit for the $M_1$ bit and "0" bits for the K, $M_2$ and G bits, which bits are arranged with the address bits in register 2 to make up an address fragment.

Logic and timing circuit 7 is concurrently examining the incoming data bitstream on lead 30-10 and the frame pulses on lead 30-1 to identify the packet header. With the high potential on send request lead 30-8, logic and timing circuit 7 examines the header portion, looking for a minimum length packet or alternatively for a packet whose data portion has been delivered. Specifically, logic and timing circuit 7 searches for a packet wherein the first (and only address) fragment has an $M_1$ bit equal to "0" or, alternatively for a packet wherein the $M_1$ bit in the last fragment is "0" and the $M_2$ bit in the prior address fragment is "1". The simultaneous monitoring of the conditions of the $M_1$ bit and prior $M_2$ bit is provided by leads 30-10 and 30-16, it being apparent that when the $M_2$ bit of the prior fragment is in the second stage of register 11 the $M_1$ bit of the present fragment (occuring two bit positions later) is on lead 30-10.

Assuming that logic and timing circuit 7 detects a packet header satisfying one or the other of the above conditions, it provides appropriate control signals to leads 30-9, 30-11, 30-12 and 30-14 to insert a new fragment in the packet header, to provide the priorly-described additional delay in the remote terminal and to insert the data burst in output data buffer 10 into the data portion of the packet. The application of a control signal to lead 30-12 by logic and timing circuit 7 parallel loads the address fragment in register 2 into shift register 4. As previously described, this fragment includes the address bits, a "1" for the $M_1$ bit and "0" bits for the K, $M_2$ and G bits. At the same time, the control signal on lead 30-12 loads a "0" bit into register 13. As described hereinafter, the bit in register 13 will follow the new address fragment and will therefore constitute the $M_1$ bit of the next fragment and, since this bit is "0", will also define the end of the header portion.

The control signals on lead 30-14 provided by logic and timing circuit 7 transfers the selections of multiplexers 5 and 16. The selection transfer of multiplexer 5 operates to select the output of shift register 4 rather than lead 30-10, thereby connecting the output of the register to the input of register 11. This transfer inserts register 4 in the path to output circuit 17 thereby inserting the new address fragment and thereafter providing the additional storage delay of register 4 to data circulating in the transmission loop, which storage delay corresponds to the storage delay required for one address fragment.

The selection transfer of multiplexer 16 operates to select the output of delay 15 rather than the output of delay 14. The cumulative delay between the generation of the frame pulse by clock and frame recovery circuit 1 and the application of this frame pulse to output circuit 17 now constitutes the delay of delay circuit 14 plus the delay of delay circuit 15. As previously noted, the delay of delay circuit 15 is identical to the delay of shift register 4. The frame pulses generated in response to the frame signals of subsequent packets will therefore be provided to output circuit 17 after a cumulative delay provided by delay circuits 14 and 15.

The application of control signals to lead 30-11 by logic and timing circuit 7 transfers the selection of multiplexer 12 from lead 30-10 to the output of register 13. The input to register 4 is now provided by register 13 rather than by the incoming bitstream on lead 30-10. Logic and timing circuit 7 also begins applying the $\Phi_0$ clock pulses to lead 30-9 to clock the bit loaded into register 13 through multiplexer 12 to shift register 4 and at the same time to clock the bit of the stored data burst in buffer 10 into register 13. The above-identified functions take place at the end of the old header portion, the new data now inserted into the data stream by the terminal following the end of the old header portion and constituting the new address fragment in shift register 4 followed by the end of header $M_1$ bit newly loaded into register 13 and then followed by a data burst in output data buffer 10.

At the end of the frame allocated to the data packet, all of the bits in the burst stored by output data buffer 10 have been shifted through register 13 into shift register 4 and are in the process of being passed to output line 102(2) by way of multiplexer 5, register 11 and output circuit 17. When the start-of-packet frame signal arrives, the frame pulse is passed by clock and frame recovery circuit 1 to logic and timing circuit 7 which thereupon removes the clock pulses from lead 30-9 and changes the control signal on lead 30-11 to restore multiplexer 12, whereby the multiplexer now passes the input bitstream on lead 30-10 to shift register 4. Logic and timing circuit 7 also energizes lead 30-7 to indicate to the customer equipment that the data burst has been transmitted and the customer equipment thereupon lowers the potential on lead 30-8. Logic and timing circuit 7 thereupon removes the energizing signal on lead 30-7. Accordingly, at this time, the incoming packet is passed through shift register 4 whereby thhe remote station provides the above-identified additional storage delay. At the same time, the frame pulse generated by clock and frame recovery circuit is passed through delay circuits 14 and 15 to thereby additionally delay the generation of the bipolar violation frame signal, which delay corresponds to the delay of shift register 4.

As previously described, the remote station removes the additional storage delay when it notes that the control terminal has changed the gap (G) bit to a "1" bit. This determination is made by logic and timing circuit 7 which, as described above, monitors the gap bit in the header portion of the packet when it appears on lead 30-13. Upon noting that the gap bit is a "1" bit, logic and timing circuit 7 changes the control signal on lead 30-14. Multiplexer 5 now selects lead 30-10 and multiplexer 16 now selects the output of delay 14. Since the gap bit condition is monitored on lead 30-13, this function occurs while the address fragment is in shift register 4. As a result, in addition to the removal of the additional delay, the address fragment which was priorly inserted and is now in shift register 4 is discarded, since the output of shift register 4 is no longer connected to register 11.

Figure 3:
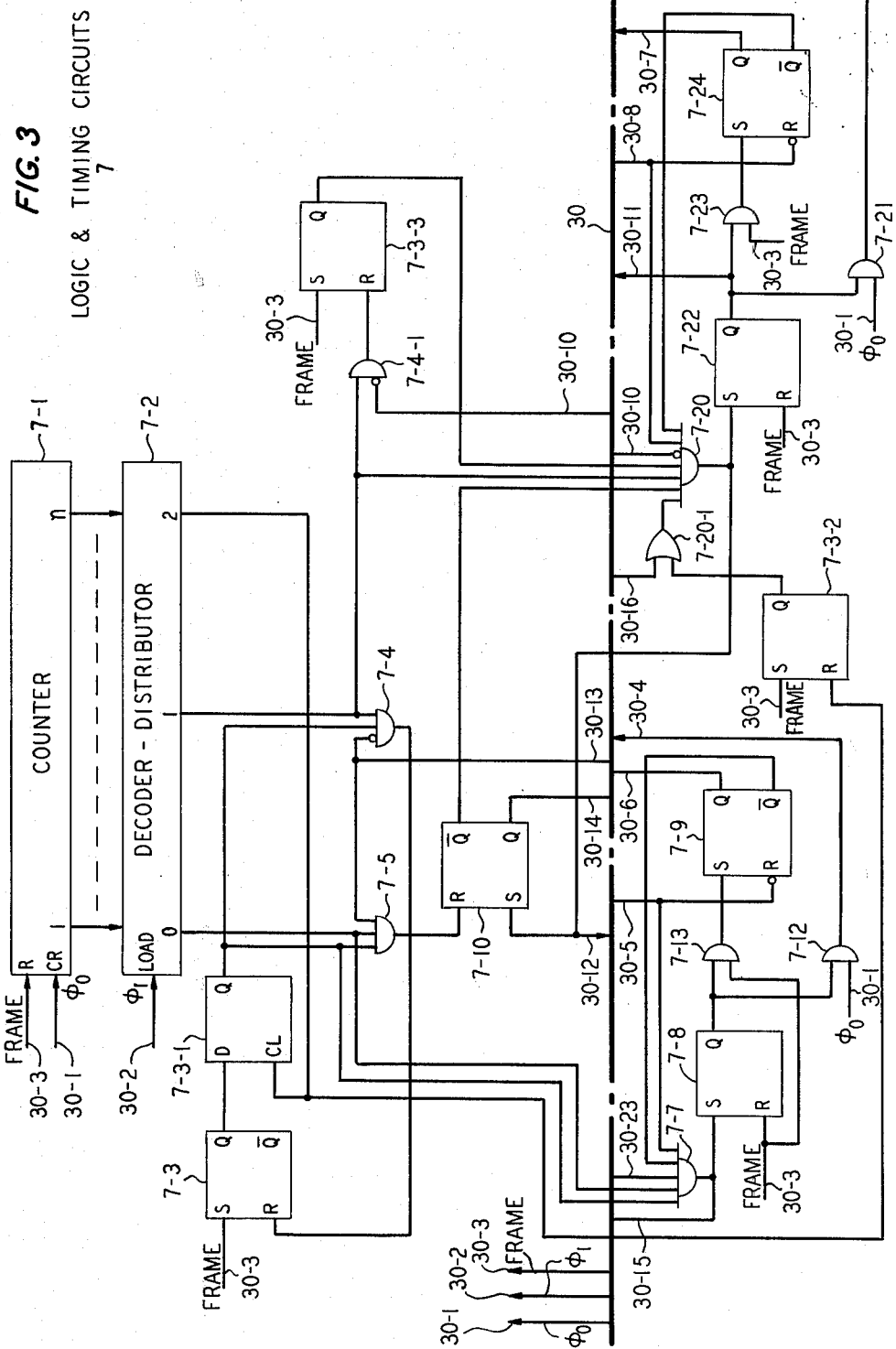
FIG. 3 depicts the details of circuitry of logic and timing circuits suitable for use in a remote terminal.

Detection and identification of the header portion of the data packet is provided by flip-flops 7-3 and 7-3-1 with gate 7-4 and by flip-flop 7-3-3 with gate 7-4-1, both cases in conjunction with counter 7-1 and decoder-distributor 7-2 as shown in FIG. 3. Counter 7-1 has a modulus corresponding to the number of bits in an address fragment. The counter is reset by the frame pulse on lead 30-3 and is advanced by the $\Phi_0$ clock pulses. Accordingly, counter 7-1 will count through cycles, certain of the cycles being concurrent in time and duration with address fragments in the packet header. The several counts of counter 7-1 are individually coincident with the several bits in the address fragments.

The outputs of counter 7-1 are passed to decoder-distributor 7-2 to control the distribution of $\Phi_1$ clock pulses to three outputs provided by decoder-distributor 7-2. Output "0" is pulsed at the approximate midpoint of the first count of counter 7-1. This pulse thus occurs during the gap bit of the address fragment. Output "1" is pulsed at the approximate midpoint of the second or $M_1$ bit of the address fragment. Output "2" is pulsed at the approximate midpoint of the third or K bit of the address fragment. It is noted that the "1" output of decoder-distributor 7-2 is connected to the input of gates 7-4 and 7-4-1, thus pulsing the gates at the approximate midpoint of the $M_1$ bit in each of the address fragments.

At the beginning of the packet header, the frame signal is received and clock and recovery circuit 1 generates the frame pulse, as previously described. This frame pulse sets flip-flops 7-3 and 7-3-3. Flip-flop 7-3-3 is reset by gate 7-4-1. The inputs to gate 7-4-1 comprise the "1" output of decoder-distributor 7-2 and lead 30-10, inverted, which lead carries the undelayed data output of data detector 3. Thus, gate 7-4-1 is enabled (during the $M_1$ bit interval) when the (undelayed) $M_1$ bit is "0". This occurs at the termination of the header portion. Gate 7-4-1, enabled, resets flip-flop 7-3-3 whereby the flip-flop is in the set condition during the header portion of the packet and in the reset condition during the data portion.

Flip-flop 7-3 which is set by the frame pulse is reset by gate 7-4. The inputs to gate 7-4 comprise the "1" output of decoder-distributor 7-2, the "Q" output of flip-flop 7-3-1 and lead 30-13 inverted. When flip-flop 7-3 is set, it applies a high potential to the "D" input of flip-flop 7-3-1. The latter flip-flop is then clocked by the "2" output of distributor 7-2. As a consequence, flip-flop 7-3-1 follows the operation of flip-flop 7-3 after a delay corresponding to a 2-bit interval. The setting of flip-flop 7-3-1 then partially enables gate 7-4. This delayed enabling of gate 7-4 permits the gate to examine the delayed output of shift register 4, since lead 30-13 extends to the output of the shift register. Gate 7-4 is thus fully enabled when the output of shift register 4 is "0" during the $M_1$ bit position of the packet header. This, of course, occurs at the termination of the header portion at the output of shift register 4. The consequent enabling of gate 7-4 resets flip-flop 7-3 and the subsequent pulse provided by the "2" output of decoder-distributor 7-2 then resets flip-flop 7-3-1. Accordingly, flip-flop 7-3 is set when the frame pulse is detected and is then reset upon the termination of the delayed header portion at the output of shift register 4. Shift register 7-3-1, as noted above, follows the operation of flip-flop 7-3.

The logic circuits designating the received mode of the remote terminal comprise flip-flops 7-8 and 7-9 and gates 7-7, 7-12 and 7-13. The determination as to whether the remote terminal should receive a data burst is made by gate 7-7. One input to gate 7-7 comprises the "$\overline{Q}$" output of flip-flop 7-9, which flip-flop is normally in the reset mode to partially enable gate 7-7. Another input to gate 7-7 comprises the "Q" output of flip-flop 7-3-1 which is, as described above, set during the delay portion of packet header to further enable gate 7-7.

The remaining three inputs to gate 7-7 comprise leads 30-5 and 30-23 and the "0" output of decoder-distributor 7-2. As described above, lead 30-5 is connected to the receive request lead extending to the customer's equipment. This lead has high potential applied thereto when the customer's equipment is prepared to receive a data burst. Under this situation, lead 30-5 further enables gate 7-7.

Lead 30-23 is connected to the output of comparator 8. As described above, the comparator 8 output is enabled if the terminal address is received and stored in shift register 4 together with a "0" bit in the $M_2$ bit position of the address fragment. This comparison occurs when the fragment is fully stored in shift register 4 and the gap marker (G) bit of the next fragment is therefore on lead 30-10. At this time, as previously disclosed, decoder-distributor 7-2 is pulsing its output terminal "0". This pulse is also applied to gate 7-7 and, assuming the above-described conditions are all met, gate 7-7 passes the decoder-distributor pulse to lead 30-15 and sets flip-flop 7-8.

The pulse on lead 30-15 sets the first stage in register 11 to thereby insert a "1" bit in the $M_1$ bit position, as previously described. The setting of flip-flop 7-8 enables gates 7-12 and 7-13. The enabling of gate 7-12 results in the passage therethrough of the $\Phi_0$ clock pulses to lead 30-4. This, as described above, loads the incoming data burst into input data buffer 6. At the termination of the packet and upon initiation of the new packet the frame pulse is again generated and passed through gate 7-13 to set flip-flop 7-9. At the same time, the frame pulse resets flip-flop 7-8 and, after this resetting, gates 7-12 and 7-13 are disabled. The disabling of gate 7-12 terminates the application of the clock pulses to lead 30-4.

The setting of flip-flop 7-9 provides a disabling potential to gate 7-7 and provides a signal via lead 30-6 to New Data Ready lead, which extends to the customer equipment. This advises the customer equipment that a data burst is available in input data buffer 6. The customer equipment subsequently withdraws the data burst and lowers the potential on Receive Request lead 30-5. This lowered potential further disables gate 7-7 and resets flip-flop 7-9. After the customer's equipment has withdrawn the data burst and is again ready to receive data it raises the potential on Receive Request lead 30-5 to again partially enable gate 7-7. The circuit is now ready to receive another data burst.

The circuitry for placing the terminal in the sending mode comprises flip-flops 7-3-2, 7-22 and 7-24 together with gates 7-20, 7-20-1, 7-21 and 7-23. The determination that the terminal should go into the send mode is made by gate 7-20.

One input to gate 7-20 is the Q output of flip-flop 7-24, which is normally in the reset condition, and this output provides a potential which partially enables gate 7-20. Another input to gate 7-20 is the Q output of flip-flop 7-10, which flip-flop is normally in the reset condition, and this output provides a potential which further enables gate 7-20. Another input to gate 7-20 is the Q output of flip-flop 7-3-3, which flip-flop is in the set condition during the reception of the header portion, and in the set condition this output provides a potential which also further enables gate 7-20. A fourth input to gate 7-20 is connected to lead 30-8, which lead extends to the Send Request lead, and the customer equipment places a high condition on this lead to further enable gate 7-20 when the customer has a data burst available for transmission.

The frame pulse generated at the beginning of the packet header sets flip-flop 7-3-2. This flip-flop is then reset by the "2" output of distributor 7-2 whereby flip-flop 7-3-2 is in the set condition during the reception of the initial or first address fragment. During this period flip-flop 7-3-2 provides a high potential through OR gate 7-20-1 to further enable gate 7-20. Alternatively, during each succeeding address fragment (if any) the output of register 11 is passed by way of lead 30-16 and OR gate 7-20-1 to gate 7-20. At the same time lead 30-10, inverted, which lead is connected to the output of data detector 3, is applied to an input of gate 7-20. The final input to gate 7-20 is connected to the "1" output of distributor 7-2. Accordingly, gate 7-20 examines the $M_1$ bit on lead 30-10 during the first address fragment or, alternatively, concurrently examines the $M_1$ bit and the $M_2$ bit of the prior fragment (on lead 30-16). If the $M_1$ bit of the first fragment is a "0" bit or the $M_1$ bit and the prior $M_2$ bits are "0" and "1" bits, respectively, gate 7-20 is enabled (indicating that the packet is available) and the pulse at the "1" output of distributor 7-2 is passed through.

The passage of the pulse through gate 7-20 provides a pulse to lead 30-12. The application of the pulse to lead 30-12 loads the address fragment stored in register 2 into shift register 4 and loads a "0" bit (designating the condition of the $M_1$ bit in the next address fragment) into register 13. At the same time, the pulse through gate 7-20 sets flip-flop 7-10. The setting of flip-flop 7-10 provides an enabling potential to lead 30-14. This enabling potential operates multiplexers 5 and 16 to insert the previously described additional storage delay to the data stream and the frame pulse as they pass through the remote terminal. Finally the pulse through gate 7-20 sets flip-flop 7-22. The setting of flip-flop 7-22 enables gates 7-21 and 7-23. Flip-flop 7-22 also applies enabling potential to lead 30-11. This enabling potential, as previously described, operates multiplexer 12 to transfer the input of shift register 4 from lead 30-10 to the output of register 13. The enabling of gate 7-21 passes the $\Phi_0$ clock pulses to lead 30-9 whereby, as previously described, the data burst in output data buffer 10 is passed to register 13. Accordingly, the new address fragment is inserted in the header of the packet, the length of the packet is expanded by the increased delay in the terminal, and the data burst from the customer is overwritten into the data portion.

At the termination of the packet, the frame signal for the new packet is received and converted to a frame pulse. This frame pulse is passed through gate 7-23 to set flip-flop 7-24. The setting of flip-flop 7-24 applies a high potential to lead 30-7, signaling the customer's equipment on the Data Transmitted lead that the data burst has been sent. The customer's equipment lowers the potential on Send Request lead 30-8 to reset flip-flop 7-24 and this potential will again be raised when the customer has another data burst readied for transmission. The above described frame pulse also resets flip-flop 7-22, disabling gates 7-21 and 7-23 and removes the enabling potential from lead 30-11.

The clock pulses on lead 30-9 are therefore terminated and the removal of high potential from lead 30-11 controls multiplexer 12 to reconnect the input of shift register 4 to lead 30-10. Accordingly, the incoming data on line 102(1) to the terminal is again passed therethrough with the exception that it is now delayed as noted above.

The delay in the terminal is removed when the terminal sees a gap marker bit which is "1" bit. This is determined by gate 7-5 which is partially enabled by flip-flop 7-3-1 in the set condition; it being previously recalled that this flip-flop is set as the delayed header portion appears at the output of shift register 4. With gate 7-5 partially enabled, it examines the bit on lead 30-13 (at the output of shift register 4) at the moment that a pulse appears at the "0" output of decoder-distributor 7-2, which pulse occurs when the gap marker bit is at the output of the shift register. Assuming that the gap bit is a "1" bit, gate 7-5 is enabled and the pulse from decoder-distributor 7-2 is passed through gate 7-5. This pulse is applied to the "reset" input of flip-flop 7-10 to place the flip-flop in the "clear" condition. In this reset condition, the "Q" output lowers the potential on lead 30-14, changing the control of multiplexers 5 and 15 to reconnect lead 30-10 to the input of register 30-11 and reconnect delay 14 to output circuit 17. The additional delay provided by the remote terminal is thereby removed. In addition, the resetting of flip-flop 7-10 again partially enables gate 7-20 to place the gate in its initial condition.

Figure 4:
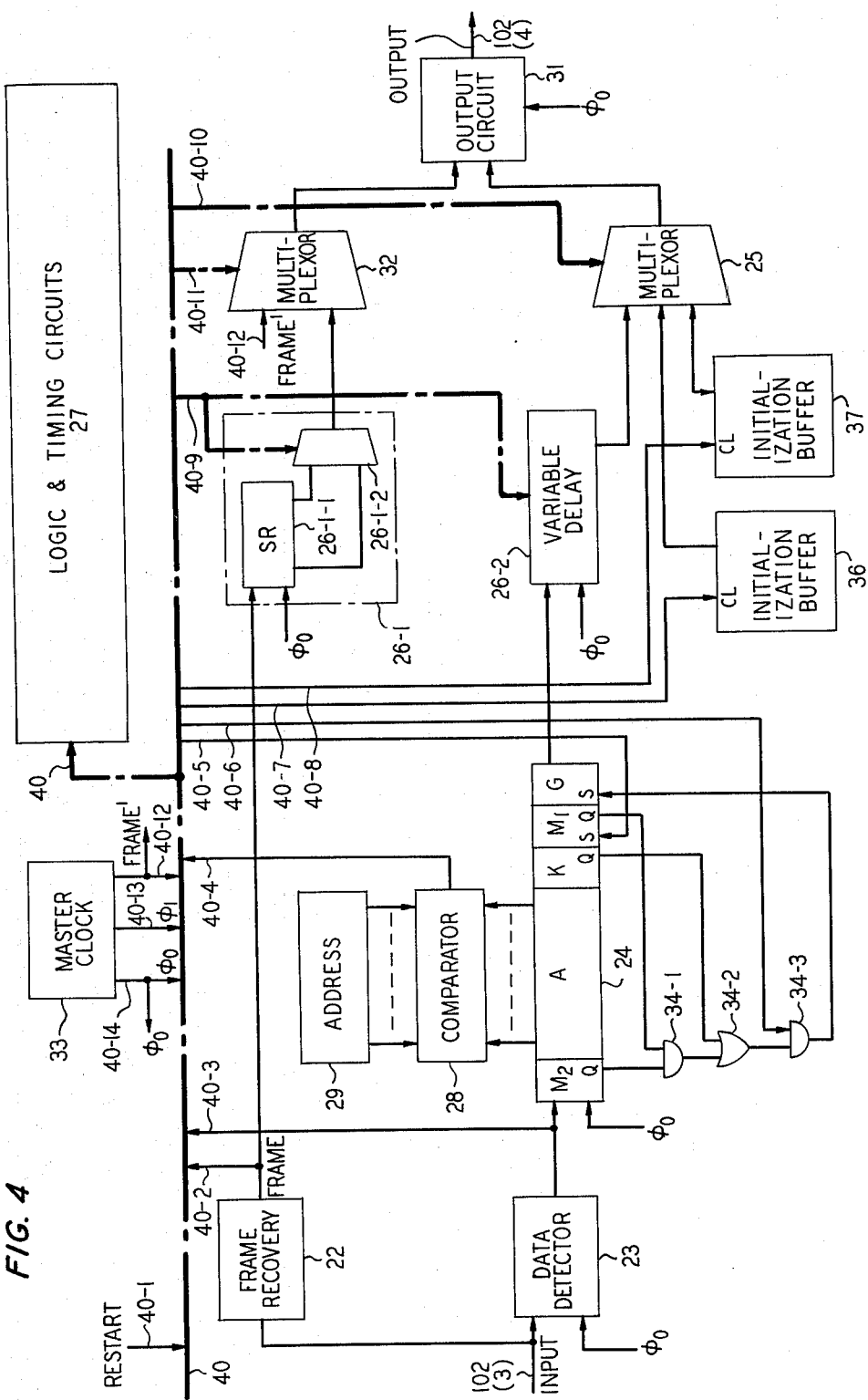
FIG. 4 discloses, in schematic form, certain circuitry and equipment of a main terminal in accordance with this invention.

The equipment at main terminal 100 is shown in FIG. 4. The incoming data stream is received on input line 102(3), and this data stream is applied to data detector 23 and to frame recovery circuit 22.

Main terminal 100 provides the timing signals for the ring system. These timing signals are generated by master clock 33. The clock signals thereby generated comprise the $\Phi_0$ clock which define the cross over points of the data signals on the transmission line. Master clock 33 also generates the $\Phi_1$ clock pulses which are 180 degrees out of phase with the $\Phi_0$ clock pulses. It additionally generates frame pulses, successive master clock framing pulses being separated by a plurality of $\Phi_0$ clock pulses corresponding to the number of bits in a minimum size packet. The $\Phi_0$ and $\Phi_1$ clock pulses and the master clock framing pulses are applied by master clock 33 to leads 40-14, 40-13, and 40-12 respectively, which leads extend to cable 40 and other circuitry in the main terminal.

Frame recovery circuit 22 may be implemented by recovery and regenerating logic circuitry similar to the correspondingly identified circuitry in the remote terminals. Accordingly, frame recovery circuitry 22 monitors the bipolar line signals on line 102(3) and produces frame pulses in response to frame signal bipolar violations. The frame pulse thus generated is applied to lead 40-2 which extends to cable 40 and is also passed to other circuitry in main terminal 100.

Data detector 23 detects the incoming bipolar pulse stream on input line 102(3) and converts the stream to a binary bit stream. Data detector 23 is implemented in substantially the same way that correspondingly identified apparatus in the remote terminals are implemented. Accordingly, data detector 23 utilizes the $\Phi_0$ clock pulses from master clock 33 to clock in the line pulse stream and pass the corresponding binary bit stream thus developed to output lead 40-3. Lead 40-3 extends to cable 40 and additionally extends to the input of shift register 24. Cable 40 is connected to logic and timing circuits 27.

In general, it is the function of logic and timing circuits 27 to determine the timing of various operations of main terminal 100. Upon determination thereof, logic and timing circuits 27 generate control signals which control the operations of various circuitry in main terminal 100, as described in detail hereinafter.

As noted above, the signal output of data detector 23 is passed to the input of shift register 24. These binary bit signals are shifted in and through shift register 24 by the $\Phi_0$ clock pulses. Shift register 24 has a length equal to that of an address fragment; that is the number of stages in shift register 24 are equal to the number of bits in an address fragment.

Various outputs of the individual stages of shift register 24 are connected to gates 34-1 and 34-2 which, in turn, are connected to gate 34-3. It is the function of these gates to control the manipulation of the gap (G) bit in the address fragment. More specifically, each instance shift register 24 contains a header fragment wherein both the $M_1$ and $M_2$ bits are "1" bit, a "1" bit is overwritten into the gap (G) bit position. In addition, if the recirculating (K) bit in the address fragment is a "1" bit, a "1" bit is similarly overwritten into G bit position. As described in detail hereinafter, logic and timing circuits 27 apply a pulse by way of lead 40-6 to gate 34-3 at the instant the address fragment is located in shift register 24. At this time the $M_2$ bit is in the first stage and the $M_1$ bit is in the next to the last stage of register 24. If both these stages contain "1" bits, gate 34-1 is enabled, passing an enabling signal through OR gate 34-2 to AND gate 34-3. The pulse on lead 40-6 thus passes through AND gate 34-3 to insert a "1" bit in the final stage of shift register 24, which stage is presently storing the G bit. Alternatively, if a "1" bit is in the third from the last stage indicating that the K bit is "1", an enabling signal is passed through OR gate 34-2 to AND gate 34-3 whereby a "1" bit is overwritten into the final stage of shift register 24.

The output of the final stage of shift register 24 is passed to variable delay circuit 26-2. At the same time the frame pulse output of frame recovery circuit 22 is passed to variable delay circuit 26-1. Variable delay circuits 26-1 and 26-2 are implemented with similarly arranged shift registers and multiplexers whose function is to provide storage delay for the frame pulse and data signals passing therethrough, which storage delay when added to other storage delays in the main terminal and the cumulative storage delays in all of the remote terminals exactly equals the storage delay necessary to accomodate or store the several bits of the packet being circulated on the ring.

Each variable delay circuit, such as variable delay circuit 26-1, comprises a shift register such as shift register 26-1-1 and a multiplexer such as multiplexer 26-1-2. (Shift register 26-1-1 in variable delay circuit 26-1 differs from the corresponding shift register in variable delay circuit 26-2 only insofar as it includes a number of initial stages equal to the number of stages in register 24.) The input signal (in this case the frame pulse) is clocked into shift register 26-1-1 by the $\Phi_O$ clock pulses. This input signal (delayed) is then obtained from the several stages in shift register 26-1-1 and passed to multiplexer 26-1-2. The multiplexer in turn is controlled by the signals on cable 40-9 to select a particular one of the shift register outputs and to pass the selected output to multiplexer 32. Correspondingly, the variable delay 26-2 circuitry passes the selected output to multiplexer 25.

During normal signaling, logic and timing circuits 27 provide appropriate control signals to leads 40-10 and 40-11, which signals control multiplexers 25 and 32 to pass the outputs of variable delay circuits 26-1 and 26-2 to output circuit 31. Output circuit 31, which is arranged in the same manner as output circuits in the remote terminals, convert the data signals from multiplexer 25 to appropriate bipolar line signals, and produce the previously disclosed bipolar violation in response to the frame pulse from multiplexer 32. These line signals are then passed to output line 102(4).

Summarizing the manner in which data normally passes through the main terminal, the line signals on input line 102(3) are applied to frame circuit 22 and data detector 23. The frame pulse recovered from the frame signal by frame recovery circuit 22 is applied, for timing purposes, to logic and timing circuits 27 and to variable delay circuit 26-1. The data bits derived from the line signal by data detector 23 is applied to shift register 24, which is arranged to store an address fragment. While the address fragment is in shift register 24, a "1" bit is invariably overwritten into the next to last stage of register 24 (to insert a "1" into the K bit position of the address fragment as described hereinafter) and a "1" bit is overwritten into the G bit position if the $M_1$ and $M_2$ bits of the fragment are both "1" or the K bit is a "1". The packet with the address fragment thus modified is passed to variable delay circuit 26-2. As previously described, the storage delay of variable delay circuit 26-1 and the cumulative storage delay of delay circuit 26-2 with register 24 and arranged with the storage delays in the remote terminals to accommodate one data packet. The frame pulse and the data bits thus delayed are passed through multiplexers 32 and 25 to output circuit 31, where the data bits are reconverted to bipolar line signals and the frame pulse controls the generation of the bipolar violation frame signal. The data packet, thus reconfigured into line signals, is then passed to output line 102(4).

To initiate the operation of the system and formulate the structure of the data packets, a pulse is provided to restart lead 40-1, which pulse may be generated by any conventional electromechanical or electronic means. This pulse is passed through cable 40 to logic and timing ciruits 27 which, as described in detail hereinafter, provide appropriate control signals to multiplexers 32 and 25. Multiplexer 32, thus controlled, connects lead 40-12, which carries the locally generated master clock frame pulse, the output circuit 31. In a corresponding manner, multiplexer 25 connects the output of initialization buffer 36 to output circuit 31. Logic and timing circuits 27 concurrently provide clock pulses to lead 40-6 to read out the data stored in initialization buffer 36.

Figure 9:
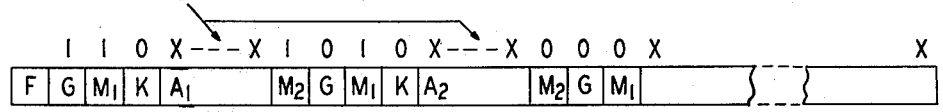

Initialization buffer 36 comprises a read-only memory which passes to its output, when clocked by clock pulses, a string of bits stored therein, which bits are arranged to make up the various bits in a minimum length data packet. The sequence of the bits obtained from initialization buffer 36 is depicted in the timing wave shown in FIG. 9. The initial bits of the data packet make up two address fragments. The first address fragment contains "1" bits in the G, $M_1$ and $M_2$ bit positions, address bits which are unique to the main terminal 100 and a "0" bit in the K bit position. The second address fragment has a "1" bit in the $M_1$ bit position repeating the main terminal address and "0" bits in the other bit positions. Thereafter, initialization buffer 36 produces a "0" bit (in the third fragment $M_1$ bit position) to designate the end of the header and follows this with a sufficient number of bits to make up the data portion of a minimum length bracket.

It is apprent that when this packet is transmitted to the remote terminals, a first remote terminal providing additional delay recognizes the "1" bit in the G bit position to eliminate the additional delay thereat in the manner previously described. Since the next address fragment has a "1" bit in the $M_1$ bit position, a "0" bit in the $M_2$ bit position and an address unique only to the main terminal, no remote terminal will attempt to receive the data burst in the packet nor will attempt to overwrite a data burst into the packet.

After the data packet is read out of initialization buffer 36, a new master clock frame pulse is locally generated and passed by way of lead 40-12 and multiplexer 32 to output circuit 31 and the data packet in initialization buffer 36 is again read out. This process is repeated a number of times corresponding to the number of remote terminals in the ring, whereupon logic and timing circuits 27 modify the control signals on lead 40-10 to change the control of multiplexer 25 to connect the output of initialization buffer 37 to output circuit 31. At the same time, logic and timing circuits 37 start applying clock pulses to lead 40-8 to read out the data stored in initialization buffer 37.

Initialization buffer 37 comprises a read-only memory which passes to its output when clocked by clock pulses a string of bits stored therein, which bits are arranged to make up the various bits in a minimum length data packet having a bit sequence depicted in the timing wave shown in FIG. 6. Accordingly, a minimum length data packet is passed to output line 102(4), which packet is similar to the above-described minimum packet shown in FIG. 6; the remote terminal responding to the minimum packet in the manner priorly described.

The minimum packet is repeatedly generated to circle the remote terminals until a remote terminal seizes the packet to insert an address fragment and overwrite a data burst. When this packet, with the address fragment, appears on input line 102(3), comparator 28 compares the bits in the address positions with the permanently wired address stored in address circuit 29. Since this packet does not contain the unique address of the main terminal, the output of comparator 28 on lead 40-4 indicates a mismatch. Logic and timing circuits 27 thereupon change the control signals on lead 40-10 and 40-11 to provide the normal connections through multiplexers 25 and 32 of the outputs of variable delay circuits 26-1 and 26-2 to output circuit 31. At the same time, logic and timing circuits 27, having determined the recycling time of this packet, register an appropriate number for defining the delay of variable delay circuits 26-1 and 26-2, applying this number to cable 40-9. The multiplexers in variable delay circuits 26-1 and 26-2 select the appropriate outputs of the registers therein to provide the priorly described storage delay. This condition now comprises a normal signaling condition of the line loop or ring.

Figure 5:
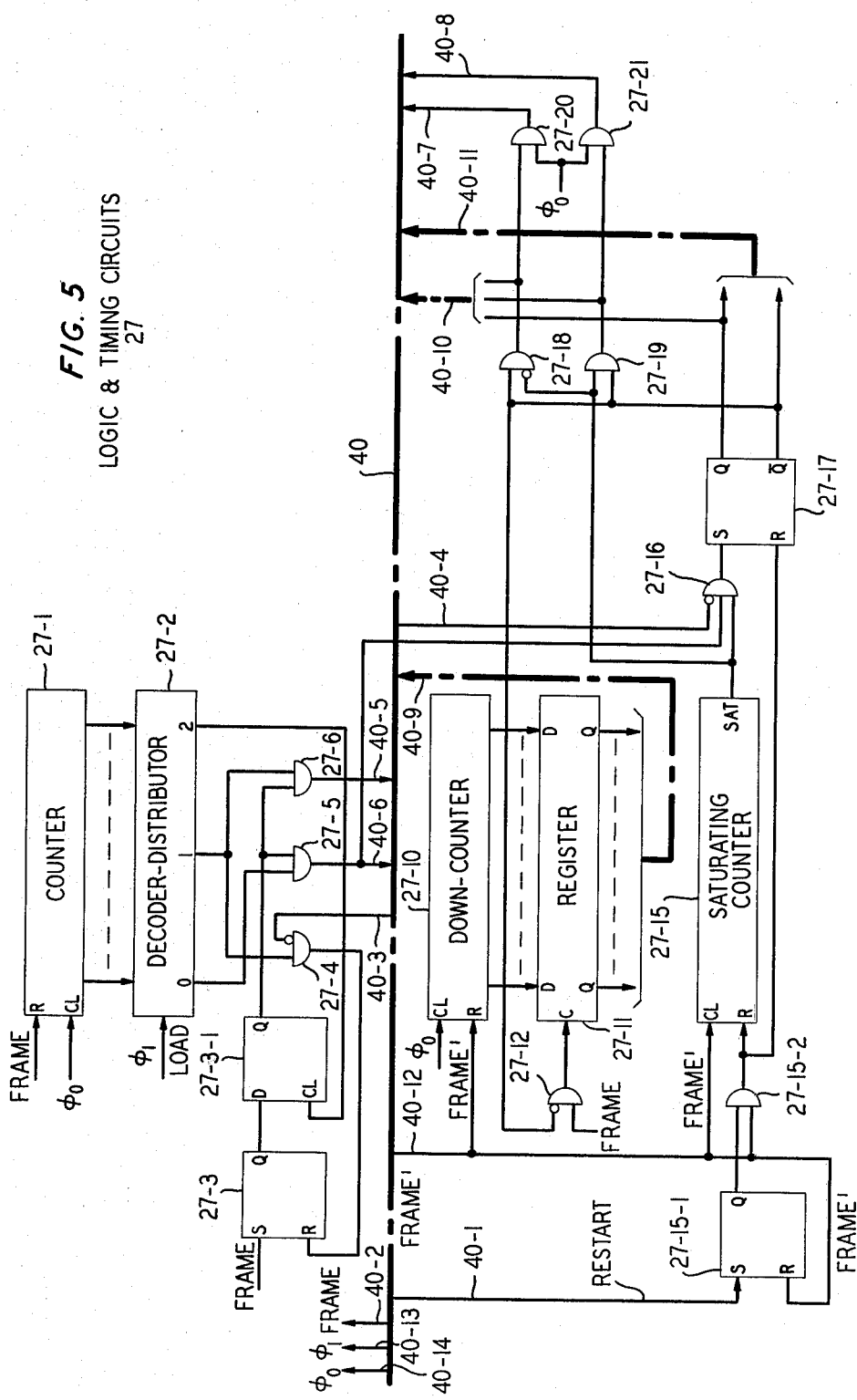
FIG. 5 depicts the details of circuitry of logic and timing circuits suitable for use in a main terminal.

One function of logic and timing circuits 27 is to detect and identify the incoming header portion of the data packet. This is provided in part by flip-flops 27-3 and 27-3-1 together with gate 27-4, counter 27-1 and detector-distributor 27-2 as shown in FIG. 5. Counter 27-1 has a modulus corresponding to the number of bits in an address fragment. The counter is reset by the frame pulse on lead 40-2 which is generated in response to the incoming frame signal and the counter is thereafter advanced by the $\Phi_0$ clock pulses. The several outputs of counter 27-1 are passed to decoder-distributor 27-2 to thereby distribute the $\Phi_1$ clock pulses. Counter 27-1 and decoder-distributor 27-2 therefore provide functions corresponding to functions of the counter and the detector-distributor in the logic and timing circuits at the remote terminals.

At the beginning of the incoming packet header the frame signal is received and frame recovery circuit 22 generates the frame pulse, as previously described, providing this pulse to lead 40-2. This frame pulse sets flip-flop 27-3 and the flip-flop applies a high potential to the "D" input of flip-flop 27-3-1. The resetting of flip-flop 27-3 is provided by gate 27-4, which resetting occurs at the termination of the incoming header portion. Gate 27-4 is pulsed by the "1" output of decoder-distributor 27-2, which pulse occurs while the $M_1$ bit of the address fragment is on lead 40-3 connected to the output of data detector 23. Accordingly, if the $M_1$ bit is a "0" bit to indicate the termination of the header, this bit, inverted, is applied to gate 27-4 and the gate, thus enabled, passes the decoder-distributor pulse to reset flip-flop 27-3. It is noted that if the incoming packet is a minimum size packet wherein the first $M_1$ bit is a "0" bit (indicating that the packet contains no header fragment) gate 27-4 resets flip-flop 27-3 before any further action may occur with respect to flip-flop 27-3-1.

Assume now that a data packet containing at least one address fragment is received. Flip-flop 27-3 remains set and a high condition is maintained on the "D" input of flip-flop 27-3-1. Decoder-distributor 27-2 pulses its "2" output (when the K bit of the address fragment is on lead 40-3), and this pulse clocks flip-flop 27-3-1 to the set condition. With the flip-flop in the set condition gates 27-5 and 27-6 are enabled. The address fragment is loaded into register 27 and gate 27-5 passes a decoder-distributor pulse from the "0" output thereof when the G bit of the next fragment is on lead 40-3 and gate 27-6 passes a decoder-distributor pulse from the "1" output when the $M_1$ bit of the next fragment is on lead 40-3. The outputs of gates 27-5 and 27-6 are applied to leads 40-6 and 40-5, respectively.

The pulse on lead 40-6 is passed, as previously described, to gate 34-3. This permits the gate to manipulate the "G" bit in the address fragment in register 24, as previously described. Since the pulse on lead 40-6 from gate 27-5 is derived from the "0" output of detector-distributor 27-2, the address fragment is presently fully stored in register 24.

Lead 40-5 provides the manipulation of the "K" bit, as previously described. The pulse provided to this lead is derived from the "1" output of decoder-distributor 27-2 (and thus occurs when the $M_1$ bit is on lead 40-3). The address fragment bits have been shifted one stage in register 24. Lead 40-5 overwrites a "1" bit into the next to the last stage of register 24 which is one stage subsequent to the stage storing the "K" bit when the address fragment is fully stored in the register. It is noted that lead 40-5 has a pulse applied thereto in the event that an address fragment has been received, as determined by the setting of flip-flop 27-3-1 and the consequent enabling of gate 27-6. Accordingly, in this latter event, a "1" bit is invariably overwritten into the K bit position of any fragment passing through the main terminal.

Another function of logic and timing circuits 27 is to control the initialization of the system. When the system is initialized a pulse is provided to lead 40-1, as previously described. This "restart" pulse sets flip-flop 27-15-1 and the flip-flop, in turn, enables gate 27-15-2. The next frame pulse locally generated by master clock 33 passes by way of lead 40-12 through gate 27-15-2 to reset counter 27-15 to an initial count and in addition to place flip-flop 27-17 in the reset condition. The locally generated frame pulse also resets flip-flop 27-15-1. It is noted that the locally generated frame pulse on lead 40-12 also resets down-counter 27-10 to an initial maximum count, the function of the down-counter being described hereinafter.

The resetting of counter 27-15 to the initial count lowers the potential at its output. This lowered potential disables gates 27-16 and 27-19 and partially enables gate 27-18. At the same time, the resetting of flip-flop 27-17 partially enables gates 27-18 and 27-19. Gate 27-18 is therefore fully enabled, enabling in turn gate 27-20. The disabling of gate 27-19 disables in turn gate 27-21. In addition, with flip-flop 27-17 reset, gate 27-12 is enabled passing the frame pulse on lead 40-2 derived from the incoming frame signal to the load input of register 27-11. The function of register 27-11 in conjunction with the function of down-counter 27-10 will be described hereinafter.

The resetting of flip-flop 27-17 together with the enabling of gate 27-18 and the disabling of gate 27-19 provide a permutation of signals to the various leads in cable 40-10. This permutation signal in cable 40-10 is passed to multiplexer 25 whereby the multiplexer is arranged to connect the output of initialization buffer 36 to output circuit 31. The enabling of gate 27-20 permits the passage of the $\Phi_0$ clock pulses to lead 40-7. Finally, the reset condition of flip-flop 27-17 provides a permutation of signals to cable 40-11 which arranges multiplexer 32 to connect the locally generated frame pulse on lead 40-12 to output circuit 31. Accordingly, the data packet in initialization buffer 36 together with an initial frame signal is repeatedly passed to output line 102(4) to be circulated through the several remote terminals.

After the packet stored in initialization buffer 36 has been sent a predetermined number of times (the advantageously one less than the modulus of counter 27-15) locally generated frame pulse advances counter 27-15 to its saturated count. At this count the output potential of counter 27-15 rises, partially enabling gates 27-16 and 27-19 and disabling gate 27-18. Flip-flop 27-17 remains in the reset condition and now fully enables gate 27-19. Gate 27-21 is now, in turn, enabled and gate 27-20 is disabled. The $\Phi_0$ clock pulses are now applied to lead 40-8. In addition, with gate 27-19 enabled and gate 27-18 disabled, the permutation of signals applied to cable 40-10 is changed to now control multiplexer 25 to connect the output of initialization buffer 37 to output circuit 31. Accordingly, the main terminal now repeatedly sends the minimum length packet stored in initialization buffer 37 to the output line for circulation through the several remote terminals.

When the frame signal of each of the stored packets from buffers 36 and 37 is being sent to the transmission line, the locally generated frame pulse (which defines the start of these packets) resets down-counter 27-10 to its maximum count. While the packet is recirculating through the remote terminals, the $\Phi_0$ pulses clock down-counter 27-10 and the counter counts down from the maximum count. When the frame signal of the data packet circles the ring and appears on the input line, frame recovery circuit 22 generates a frame pulse and this frame pulse is passed through gate 27-12 to load the count of down-counter 27-10 into register 27-11. Accordingly, the number loaded into register 27-11 constitutes the number of storage delay bit intervals which must be added to the storage delay of the remote terminals (as defined by the recycling time of the frame signal) in order for the ring to accommodate a minimum length data packet.

When a data packet from initialization buffer 36 cycles through the remote terminals and returns to the main terminal, the two address fragments in the header are passed into register 24. Each address fragment is fully loaded into the register at the time that a pulse is derived from the "0" terminal of decoder-distributor 27-2. Since the address in the fragment corresponds to the address stored in address circuit 29, comparator 28 finds a match and thereby provides an enabling potential, inverted, to gate 27-16 (at the same time gate 27-16 is pulsed by gate 27-5). This enabling potential, inverted, disables gate 27-16 to preclude passage of the gate 27-5 pulse.

When a data packet from initialization buffer 37 cycles through the remote terminals, without any remote terminal siezing the packet, the packet returns to the main terminal without an address fragment therein. In this event, flip-flop 27-3 is reset before flip-flop 27-3-1 is clocked and the latter flip-flop remains in the reset condition. Gate 27-5 is therefore disabled and does not apply a pulse to gate 27-16.

Assume now that a remote terminal siezes the packet from initialization buffer 37. This remote terminal inserts an address fragment, as previously described, and, when the packet cycles back to the main terminal, the address fragment is loaded into register 24, flip-flop 27-3-1 is set to enable gate 27-5 and the gate passes the pulse from the "0" terminal of decoder-distributor 27-2 to gate 27-16. Since the address in the fragment does not correspond to the main terminal address stored in address circuit 29, comparator 28 finds a mismatch and thereby provides a low potential to lead 40-4. This low potential, inverted, is passed to gate 27-16 to fully enable the gate. Gate 27-16 passes the gate 27-5 pulse to set flip-flop 27-17.

Flip-flop 27-17, set, disables gates 27-18 and 27-19 and these gates disable gates 27-20 and 27-21 to terminate the clock pulses to buffers 36 and 37. Flip-flop 27-17 set and gates 27-18 and 27-19 disabled apply a permutation of signals to cable 40-10 which controls mutiplexer 25 to connect the output of variable delay circuit 26-2 to output circuit 31. Flip-flop 27-17, set, also applies a permutation of signals to cable 40-11 which controls multiplexer 32 to connect the output of variable delay circuit 26-1 to output circuit 31. Finally, flip-flop 27-17, set, disables gate 27-12 and the gate thereafter proceeds further loading of register 27-11. Accordingly, the number last loaded into the register is maintained therein, which number constitutes the storage delay to be added at the main terminal, as priorly described, as determined from the recirculating time of the packet which was seized by a remote terminal. This number in register 27-11 is passed via cable 40-9 to variable delay circuits 26-1 and 26-2 to set the appropriate delay therein. The main terminal is thus initialized and in the condition for normal communication.

We claim:

1. In a transmission system (102) for passing packets of data through a plurality of stations (101), each data packet having a portion for accommodating a burst of data destined for an addressee station, a portion for accommodating data identifying the addressee station and data indicating whether the addressee station has withdrawn the data burst and wherein individual ones of the stations include data inserting means (4, 5, 10, 12, 13, 7-10, 7-20, 7-21, 7-22) effective when the station has a data burst thereat destined for a new addressee station and responsive to incoming data in the packet indicating that the data burst has been withdrawn therefrom for inserting the data burst thereat into a portion of the packet priorly accommodating the withdrawn data burst;

characterized in that the data inserting means (4, 5) includes means for inserting new addressee station identifying data subsequent to the portion of the packet accommodating the data identifying the addressee station which withdrew the data burst.

2. In a transmission system, in accordance with claim 1, wherein the new addressee station inserting means includes delay storage means (4) for storing the new addressee station identifying data and means (5) responsive to the data inserting means for connecting an output of the delay storage means to the transmission system after passage therethrough of the data identifying the addressee station which withdrew the data burst.

3. In a transmission system, in accordance with claim 2, wherein the data inserting means includes means (10) for storing the data burst thereat and means (4, 5, 12, 13) for applying the stored data burst to the transmission system after the application thereto of the new addressee station identifying data.

4. In a transmission system, in accordance with claim 2, wherein the individual station further includes means (5) responsive to the data inserting means for interrupting the passage of data through the station while the stored data is being applied to the transmission system.

5. In a transmission system, in accordance with claim 4, wherein the individual station further includes means

(12) for passing the incomimng data to an input of the delay storage means whereby the incoming data is delayed in passing therethrough by the delay storage means when the passage of data is interrupted and the output of the delay storage means is connected to the data transmission system.

6. In a transmission system, in accordance with claim 5, wherein the data inserting means includes means (10) for storing the data burst and means (12, 13) for connecting the data burst storing means to the input of the delay storage means.

7. In a transmission system, in accordance with claim 1, wherein the data inserting means includes means (4, 5, 12) for delaying the passage of data through the station for a delay interval corresponding to an interval necessary to insert the new addressee station identifying data.

8. In a transmission system, in accordance with claim 7, wherein the transmission system serially interconnects the plurality of stations in a ring and wherein at least one of the stations includes means responsive to the data indicating that a data burst has been withdrawn for inserting predetermined data in the packet.

9. In a transmission system, in accordance with claim 8, wherein the individual station further includes means (7-5, 7-10) operated by the delaying means and responsive to the passage therethrough of the predetermined data for removing the passage delay of the data.

10. In a transmission system (102) for conveying packets of data through a plurality of stations (101), each data packet having a data portion containing a burst of data destined for a first addressee station and a header portion containing, in sequence, data identifying the first addressee station, data indicating whether or not the first addressee station has withdrawn the data burst and data defining an end of the header portion and wherein individual ones of the stations include data inserting means (4, 5, 10, 12, 13, 7-10, 7-20, 7-21, 7-22) effective when the station has a data burst thereat destined for a new addressee station and responsive to data in the packet being conveyed therethrough indicating that the data burst has been withdrawn therefrom for inserting into the data portion containing the withdrawn data burst the data burst thereat, characterized in that the data inserting means includes means (4, 5) for inserting, in sequence, data identifying the new addressee station and new data indicating that the new addressee station has not withdrawn the data burst into a portion of the packet subsequent to the portion containing the first addressee station identifying data.

11. In a transmission system, in accordance with claim 10, wherein the data inserting means further includes means (12, 13) for inserting new end of header defining data into a portion of the packet subsequent to the portion where the new addressee station identifying data and the new data burst withdrawn indicating data are inserted.

* * * * *